April 29, 1969  R. B. HOLLAND ET AL  3,441,245

FLUID-ACTUATED, ANTI-FLUTTER, PINCH-SLEEVE, THROTTLING VALVE

Filed March 25, 1966  Sheet 1 of 3

INVENTOR.
ROBERT BARNSLEY HOLLAND
DEVERE A. FOWLER
BY MALLINCKRODT & MALLINCKRODT

ATTORNEYS

INVENTOR.
ROBERT BARNSLEY HOLLAND
DEVERE A. FOWLER
BY MALLINCKRODT & MALLINCKRODT
ATTORNEYS

April 29, 1969 R. B. HOLLAND ET AL 3,441,245
FLUID-ACTUATED, ANTI-FLUTTER, PINCH-SLEEVE, THROTTLING VALVE
Filed March 25, 1966

INVENTOR.
ROBERT BARNSLEY HOLLAND
DEVERE A. FOWLER
BY MALLINCKRODT &
MALLINCKRODT
ATTORNEYS

United States Patent Office 3,441,245
Patented Apr. 29, 1969

3,441,245
FLUID-ACTUATED, ANTI-FLUTTER, PINCH-SLEEVE, THROTTLING VALVE
Robert Barnsley Holland, Salt Lake City, and DeVere A. Fowler, Lehi, Utah, assignors to The Galigher Company, Salt Lake City, Utah, a corporation of Utah
Filed Mar. 25, 1966, Ser. No. 537,408
Int. Cl. F16k 7/07
U.S. Cl. 251—5                                8 Claims

ABSTRACT OF THE DISCLOSURE

A fluid-actuated, pinch-sleeve, throttling valve constructed to prevent flutter when pressure fluid is introduced for throttling purposes short of complete closure of the valve. The construction employs collapsible baffling means, within each of the fluid-pressure chambers that are ordinarily provided to exert throttling or closing pressure on an elongate sleeve diaphragm provided by a valve of the general type concerned, so as to restrict the otherwise free longitudinal flow of pressure fluid in and along the chamber. The baffling means means preferably comprise compressible and expansible, sponge-like material, e.g. a foamed plastic, but can be in the form of a series of collapsible baffle fins preferably molded with and exteriorly of the sleeve diaphragm. A series of rigid baffles may also be provided along the inner surface of the valve body alternating in position with collapsible baffles provided by the sleeve diaphragm.

---

Figure 1:
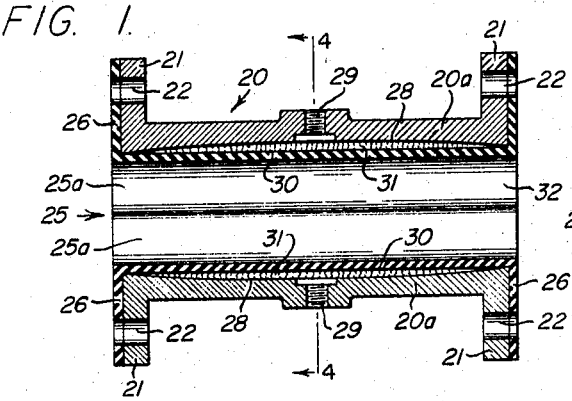

This invention relates to a well known type of valve that embodies an elongate, flexible, sleeve diaphragm, usually of rubber, through which passes a flow of material to be controlled and which is subject to being pinched together under fluid pressure to constrict or throttle the flow to any desired degree between fully open and fully closed positions.

The invention constitutes an improvement on known constructions for valves of this type, so as to greatly alleviate or completely eliminate a difficulty that has long impaired their usefulness where throttling is an important factor in the operation.

Such valves are normally constructed for the application of fluid pressure to opposite sides of the sleeve, exteriorly thereof, so as to pinch the sleeve more or less and constrict or close the flow passage therethrough. Either a single pressure chamber or several, normally only two, are formed about the sleeve for the desired application of fluid pressure to opposite sides of or completely around the sleeve so as to exercise the required pinching action from both sides simultaneously. Although this is the usual construction, it is conceivable that restraint against outward deformation can be supplied at one side of the sleeve, as by means of a rigid wall preferably conforming to the configuration of the sleeve in its normal open position, and that provision can be made for the application of fluid pressure to only one side of the sleeve.

The difficulty with these various constructions is that throttling pressure, as contrasted with closing pressure, leads to highly undesirable flutter of the valve. Thus, use of these valves tends to be restricted to instances where little or no throttling of flow is required.

In accordance with the present invention, we have found a way to greatly minimize or completely eliminate flutter in valves of this type and to thereby greatly extend their fields of usefulness.

This is accomplished by restricting free flow of the pressure fluid within the pressure chamber or chambers, to thereby positively enforce what might be regarded as substantially uniform pressure conditions throughout such chamber or chambers, from one end to the other end of each, and to stabilize such pressure fluid against erratic impulses and against wave action due to throttling.

An excellent way of accomplishing this is to provide baffling means within the chamber or chambers, and a presently preferred form of baffling means is a flexible porous material having a three-dimensional network of interconnected pores or cells, for example, a sponge-like material, such as natural or synthetic sponge. The size of the cells and/or interconnecting pores of the sponge-like material can be selected to exercise the desired degree of flow restriction for the pressure fluid, be it a liquid or a gas or a combination of both, in any given use of the valve.

Other forms of baffling means can be employed, for example, baffle plate fins applied to the sleeve exteriorly thereof or to the interior surfaces of the walls that, with the sleeve, define the pressure chamber or chambers, or to both in non-interfering arrangement.

Additional objects and features of the invention will become apparent from the following detailed description of the specific constructions illustrated in the accompanying drawings to represent the best mode presently contemplated of placing the invention in practice.

Figure 4:
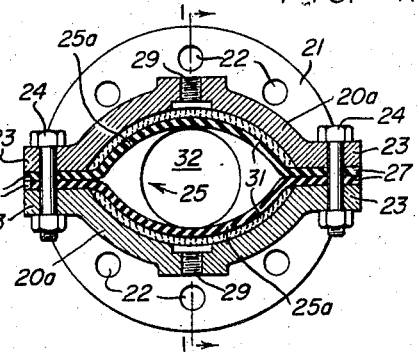
Figure 2:
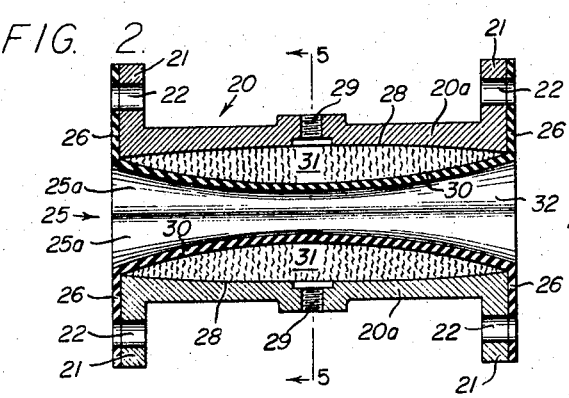
Figure 5:
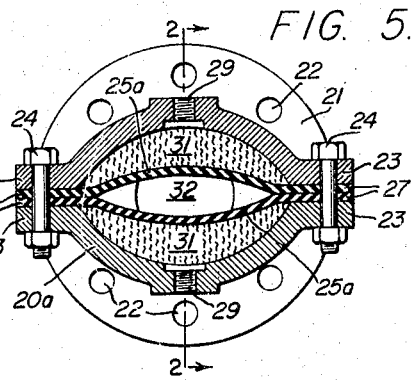
Figure 3:
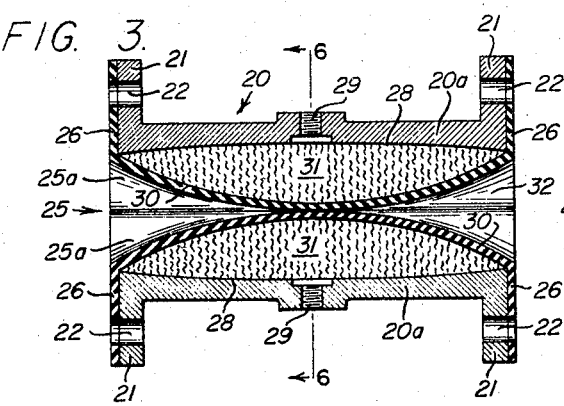
Figure 6:
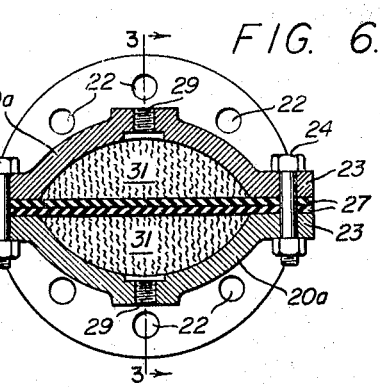
Figure 7:
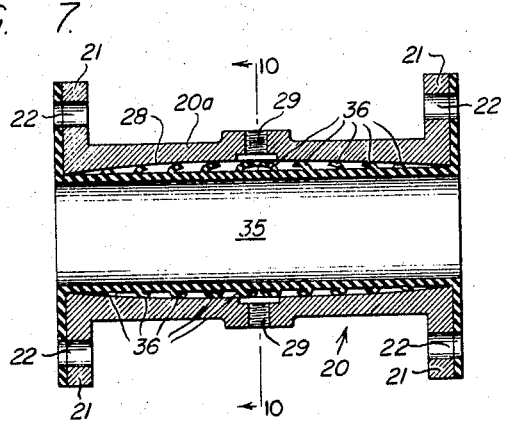
Figure 10:
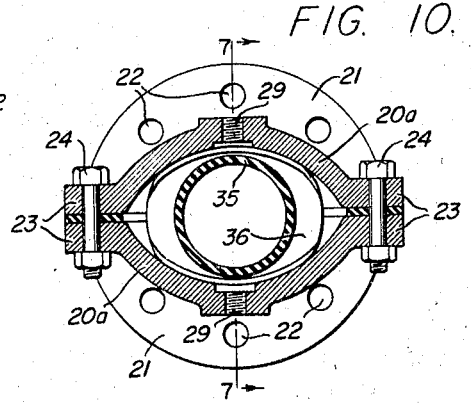
Figure 8:
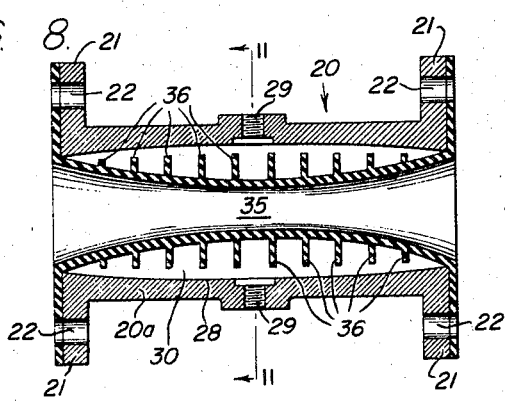
Figure 9:
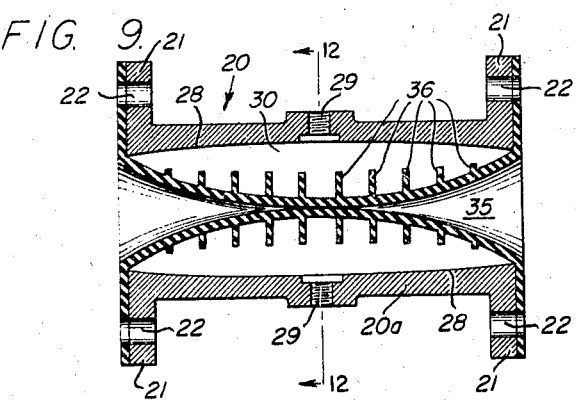

In the drawings:

FIG. 1 represents a central axial section taken through a typical and well-known valve of the type concerned, which has a split sleeve diaphragm and which includes one form of the novel structure of the invention, the valve being shown fully open during normal operation;

FIG. 2, a corresponding view of the same valve as throttled to cut down the rate of material flow therethrough;

FIG. 3, a corresponding view of the same valve as completely closed;

FIG. 4, a vertical section taken on the line 4—4 of FIG. 1;

FIG. 5, a vertical section taken on the line 5—5 of FIG. 2;

FIG. 6, a vertical section taken on the line 6—6 of FIG. 3;

FIG. 7, a view similar to that of FIG. 1, but showing a different form of the novel structure of the invention in connection with a one-piece sleeve diaphragm;

FIGS. 8 and 9, views corresponding to those of FIGS. 2 and 3, respectively, but showing the valve of FIG. 7;

FIG. 10, a vertical section taken on the line 10—10 of FIG. 7.

Figure 11:
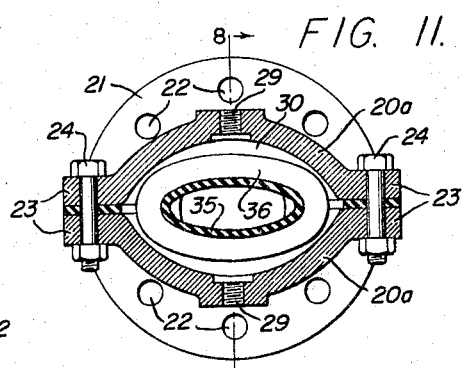

FIG. 11, a vertical section taken on the line 11—11 of FIG. 8.

Figure 12:
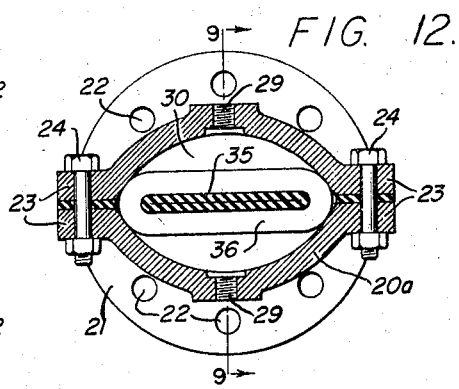

FIG. 12, a vertical section taken on the line 12—12 of FIG. 9.

Figure 13:
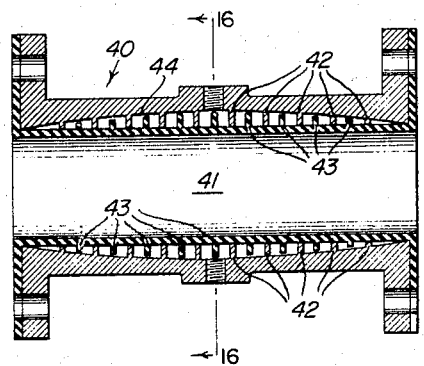
Figure 16:
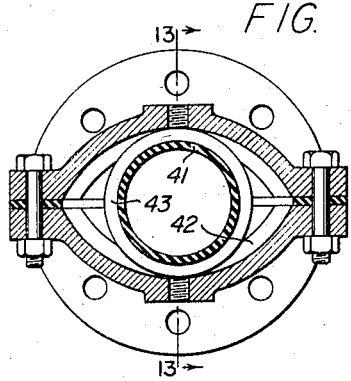
Figure 14:
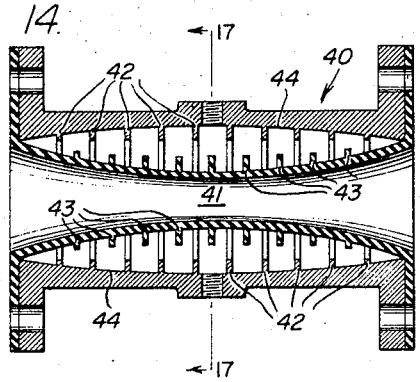
Figure 17:
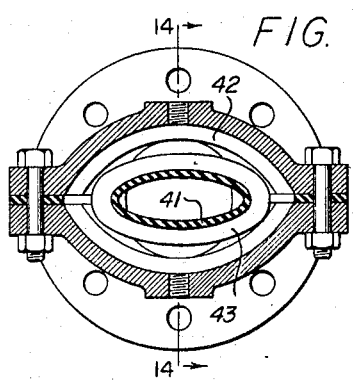
Figure 15:
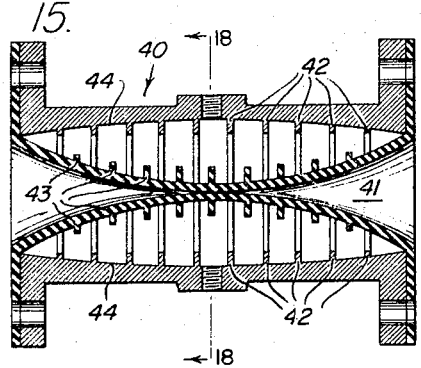
Figure 18:
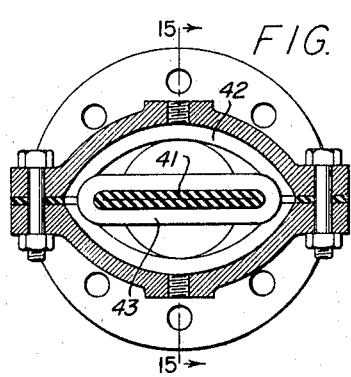

FIGS. 13, 14, and 15, views corresponding to those of FIGS. 1, 2, and 3, respectively, and 7, 8, and 9, respectively, but showing another differing form of the novel structure of the invention in connection with a one-piece sleeve diaphragm as in the embodiment of FIGS. 7–12;

FIG. 16, a vertical section taken on the line 16—16 of FIG. 13;

FIG. 17, a vertical section taken on the line 17—17 of FIG. 14;

FIG. 18, a vertical section taken on the line 18—18 of FIG. 15.

Referring now to the drawings:

In the embodiment of FIGS. 1–6, the valve body 20 is of conventional, split formation, made up of two opposing half-sections 20a, respectively, of some suitable rigid material, such as cast iron, to include end flanges 21, having bolt holes 22 for connecting the valve into a piping system or the like, and longitudinal flanges 23, having holes for receiving bolts 24 that hold the two half-sections tightly together.

Within the valve body 20 is a flexible sleeve 25, usually of natural or synthetic rubber and usually fabricated and suitably reinforced with fabric or cord (not shown) in a manner that is conventional. As here illustrated, such sleeve is also of split formation (through it need not be), with opposing half-sections 25a, respectively, corresponding in general with the half-sections 20a of the rigid valve body, and each having an end flange 26, with bolt holes, and longitudinal flanges 27, with holes for accommodating the bolts 24.

Except for internal concavities 28, FIGS. 1–3, in the respective valve body half-sections 20a, for accommodating baffling means supplied in accordance with the invention, the valve body 20 and sleeve 25 are conventional. Each valve body half-section is provided with an internally threaded passage 29 for the reception of a nipple (not shown) as a connection for a pressure-fluid supply and exhaust system of conventional type to introduce a pressure fluid, advantageously water, into the chamber 30 defined between the interior wall surface of such valve body half-section and the exterior wall surface of the corresponding sleeve half-section 25a.

In this particular embodiment, the concavities 28 are provided to accommodate—when the valve is fully open—compressible and expansible pads 31 of some porous material that embodies a three-dimensional network of interconnected pores or cells, advantageously a synthetic sponge material of foamed plastic having the characteristics of flexible polyurethane foam. These serve as the baffling means and are disposed within the respective chambers 30. Thus, when pressure fluid is introduced into the chambers 30, located at opposite sides of the sleeve 25, for the purpose of throttling such sleeve and of reducing flow of material through the flow passage 32, FIGS. 4–6 of the valve, the sponge-like material expands, as in FIGS. 2 and 5, and flow of the fluid within such chambers is impeded and stabilized and the pressure applied along the length of the sleeve tends to be uniform. The fluid is not subject to erratic surges in waves from one end of each chamber to the other end thereof, which surges, in valves of conventional construction, result in highly undesirable flutter.

The pads or masses of sponge-like material 31 can either be freely placed in the chambers 30 or attached by adhesive to either the valve body or the sleeve or to both. It is preferred that the nature of the material and the quantity used be such as to accept all the pressure fluid introduced for complete closure of the valve, see FIGS. 3 and 6, and to expand sufficiently to completely fill the chambers. However, this is not necessary, for flutter is not ordinarily a problem when the valve is completely closed.

In the embodiment of FIGS. 7–12, there is no change in the valve body. It could, however, be provided with inflow-outflow port 29 at only one side. For convenience of illustration, it is shown as the same split valve body 20, having the same concavities 28 for accommodating baffling means. The sleeve diaphragm 35 is, in this instance, made entirely integral, as a single piece. This is not unusual in valves of this type and is shown in this embodiment merely to illustrate the variation possible in all forms of the invention.

What is new about the sleeve diaphragm 35 is the incorporation therewith, as an integral part thereof, of baffle rings 36 encircling the sleeve at intervals to provide a series of baffles extending longitudinally of the sleeve. These are flexible and are accommodated by the concavities 28 in the fully open condition of the valve, as shown in FIGS. 7 and 10.

In the throttled condition of the valve, shown in FIGS. 8 and 11, and in the fully closed condition, shown in FIGS. 9 and 12, the portions of the baffle rings 36 at opposite sides of the sleeve 35 do not extend entirely across the respective chambers 30, but they do effectively baffle the actuating fluid in the immediate vicinity of the sleeve.

In the embodiment of FIGS. 13–18, both the rigid, split valve body 40 and the flexible, one-piece sleeve diaphragm 41 are provided with baffle rings, indicated 42 and 43, respectively, formed integrally therewith. They are staggered in arrangement, so one set of baffle rings is accommodated by the set of spaces between the baffle rings of the other set of baffle rings, the internal valve body concavities 44 that correspond to 28 in the other embodiments being here deepened so the rigid baffle rings 42 of the valve body will permit full opening of the sleeve diaphragm, see FIGS. 13 and 16.

The several embodiments here shown merely exemplify the many possibilities of providing baffling means in valves of the type concerned. It should be understood that a variety of forms and shapes of baffling means can be utilized with more or less effectiveness for the purpose intended and that the method may be performed in a variety of ways irrespective of the provision of baffling structure in the valve construction itself, for example, by utilizing a dilatant liquid (one that thickens upon being agitated) as the valve-actuating fluid, for example, a clay slurry such as is described on page 35, paragraph F–30, in "Tentative Standards of Hydraulic Institute" (9th Edition) published by the Hydraulic Institute, 122 E. 42nd St., New York 17, N.Y. in 1951.

Whereas there are here illustrated and specifically described certain preferred constructions of apparatus which are presently regarded as the best mode of carrying out the invention, it should be understood that various changes can be made and other constructions adopted without departing from the inventive subject matter particularly pointed out and claimed herebelow.

We claim:

1. A fluid-actuated, anti-flutter, pinch-sleeve, throttling valve comprising
   a valve body having internal wall surfaces defining a through-passage for the flow of material;
   a fluid-tight, flexible sleeve of deformable material lining said through-passage and secured in fluid-tight relationship adjacent its ends to said valve body to provide, with the valve body, at least one fluid-pressure chamber for controlling flow of material through said sleeve;
   means for introducing into and exhausting from said chamber a pressure fluid; and
   collapsible baffling means within each said chamber for restricting free flow of said pressure fluid in and along the chamber,
   said baffling means comprising compressible and expansible material providing a three-dimensional network of interconnected pores.

2. A combination as set forth in claim 1, wherein the material is sponge-like.

3. A combination as set forth in claim 2, wherein the material is a foamed plastic of the nature of flexible polyurethane foam.

4. A fluid-actuated, anti-flutter, pinch-sleeve, throttling valve comprising
   a valve body having internal wall surfaces defining a through-passage for the flow of material;
   a fluid-tight, flexible sleeve of deformable material lining said through-passage and secured in fluid-tight relationship adjacent its ends to said valve body to provide, with the valve body, at least one fluid-pressure chamber for controlling flow of material through said sleeve;
   means for introducing into and exhausting from said chamber a pressure fluid; and
   collapsible baffling means within each said chamber for restricting free flow of said pressure fluid in and along the chamber;
   the internal wall surfaces of the valve body that define the through-passage being of concave formation to accommodate the baffling means when the valve is fully open.

5. A valve body as set forth in claim 4, wherein the collapsible baffling means comprises compressible and expansible material providing a three-dimentional network of interconnected pores.

6. A sleeve diaphragm for a fluid-actuated, anti-flutter, pinch-sleeve, throttling valve, comprising a fluid-tight, open-ended, flexible sleeve of deformable material adapted to be received by the through-passage of a valve body to define, between the outside of said sleeve and the valve body surfaces defining said through-passage, at least one chamber for the reception of a pressure fluid for controlling said valve;

and collapsible baffling means for the pressure fluid introduced into each said chamber, said baffling means comprising compressible and expansible material providing a three-dimensional network of interconnected pores.

7. A sleeve diaphragm as set forth in claim 6, wherein the material is sponge-like.

8. A sleeve diaphragm as set forth in claim 6, wherein the material is a foamed plastic of the nature of flexible polyurethane foam.

References Cited

UNITED STATES PATENTS

| 994,168 | 6/1911 | Koppitz | 251—5 |
| 2,470,744 | 5/1949 | Korn | 251—5 X |
| 2,706,612 | 4/1955 | Ratelband | 251—5 X |
| 3,143,124 | 8/1964 | Todd | 251—5 X |

ARNOLD ROSENTHAL, *Primary Examiner.*

U.S. Cl. X.R.

251—61.1